US010691383B2

(12) United States Patent
Koike

(10) Patent No.: US 10,691,383 B2
(45) Date of Patent: Jun. 23, 2020

(54) IMAGE FORMING APPARATUS AND CONTROL METHOD

(71) Applicant: CANON KABUSHIKI KAISHA, Tokyo (JP)

(72) Inventor: Hiroaki Koike, Kokubunji (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/823,254

(22) Filed: Nov. 27, 2017

(65) Prior Publication Data

US 2018/0150262 A1    May 31, 2018

(30) Foreign Application Priority Data

Nov. 29, 2016  (JP) ................................ 2016-230828

(51) Int. Cl.
*G06F 3/12*        (2006.01)
(52) U.S. Cl.
CPC ............ *G06F 3/123* (2013.01); *G06F 3/1204* (2013.01); *G06F 3/1205* (2013.01); *G06F 3/1253* (2013.01); *G06F 3/1259* (2013.01); *G06F 3/1279* (2013.01); *G06F 3/126* (2013.01); *G06F 3/1285* (2013.01)
(58) Field of Classification Search
CPC ...... G06F 3/123; G06F 3/1259; G06F 3/1279; G06F 3/1204
USPC .............................................. 358/1.15, 1.14
See application file for complete search history.

(56) References Cited

U.S. PATENT DOCUMENTS

| 7,199,886 | B2 * | 4/2007 | Brandl ................... G06K 15/00 358/1.1 |
| 2012/0154857 | A1 * | 6/2012 | Matsuyama .......... G06F 3/1204 358/1.15 |
| 2013/0250328 | A1 * | 9/2013 | Ohtsuka ............... H04N 1/0066 358/1.13 |
| 2014/0185069 | A1 * | 7/2014 | Seto .................... G06K 15/4065 358/1.9 |
| 2016/0253139 | A1 * | 9/2016 | Nomura ................ G06F 3/1205 358/1.13 |

FOREIGN PATENT DOCUMENTS

JP              2014-235576 A    12/2014

* cited by examiner

*Primary Examiner* — Henok Shiferaw
(74) *Attorney, Agent, or Firm* — Canon U.S.A., Inc. IP Division

(57) ABSTRACT

An image forming apparatus that is controlled by a job processing program serving as a portion of a firmware and into which an application program is installable, the image forming apparatus includes at least one hardware processor which executes an instruction stored in a memory performs operations which include determining whether a print job has been successfully input to the job processing program, in accordance with execution of the application program, terminating the application program without the application program receiving completion notification of the print job, in accordance with a result of the determination that the print job has been successfully input, acquiring a status of the print job under control of the job processing program after termination of the application program, and notifying status information based on the status acquired by the acquiring.

14 Claims, 14 Drawing Sheets

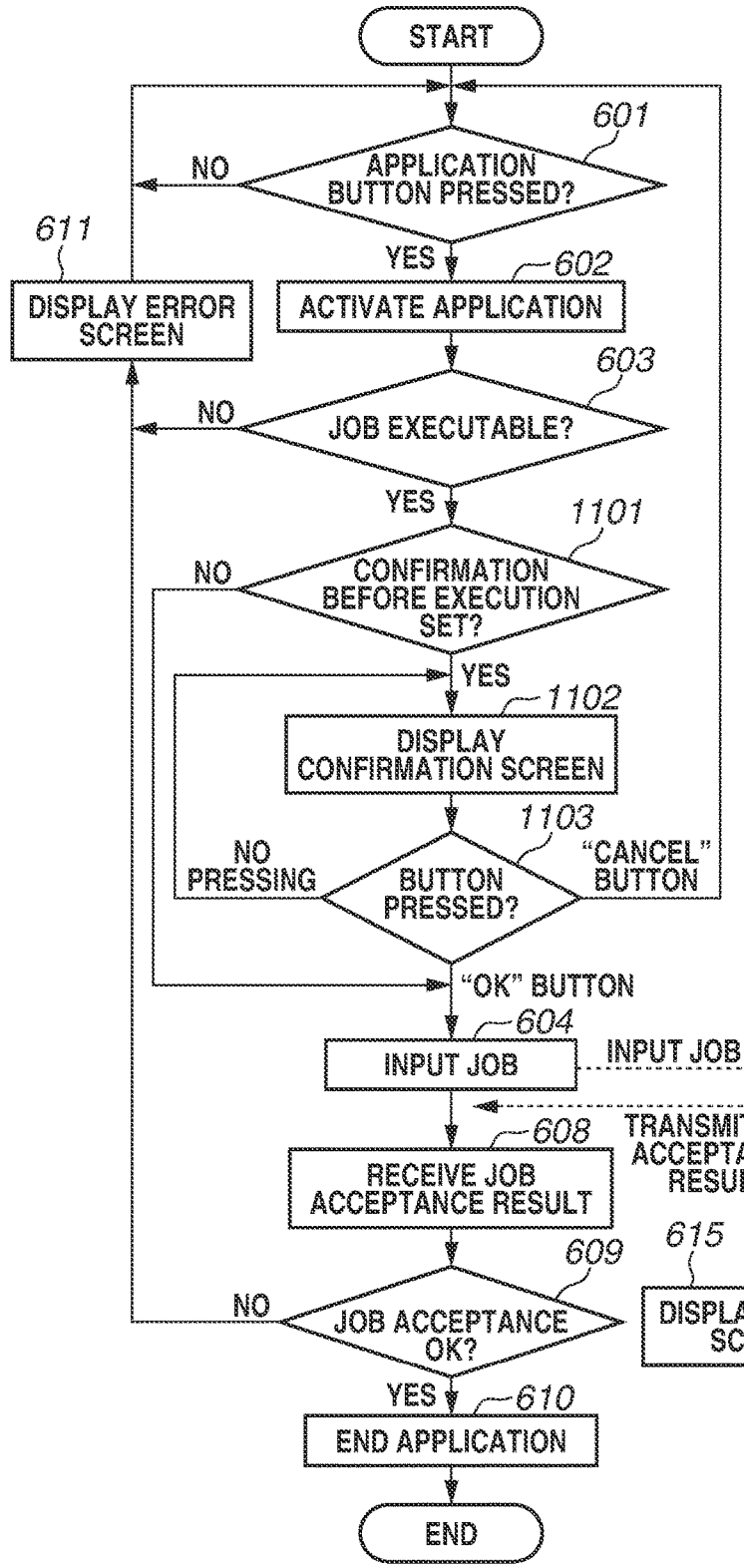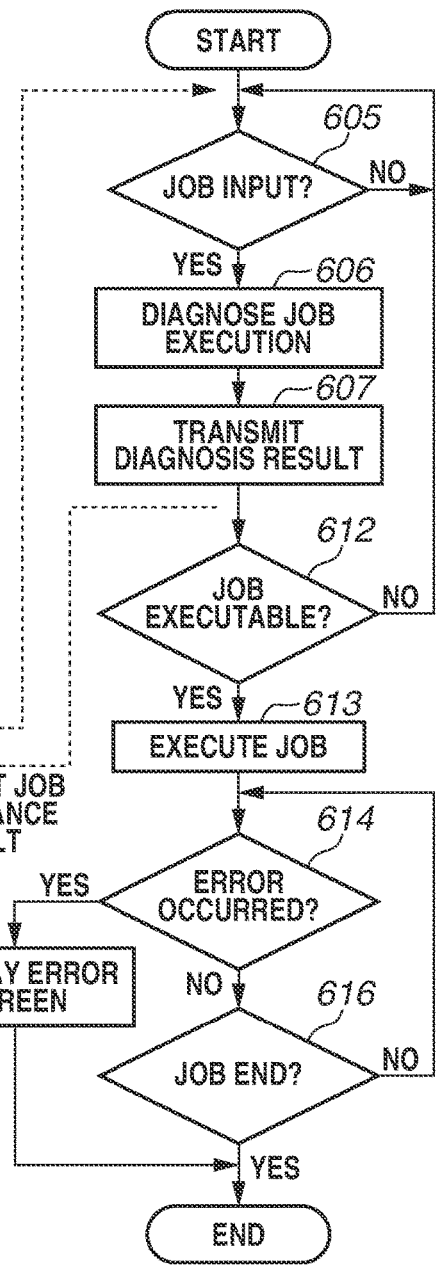
FIG.11

IMAGE FORMING APPARATUS AND CONTROL METHOD

BACKGROUND OF THE INVENTION

Field of the Invention

The present invention relates to built-in equipment including an image forming apparatus that operates application programs, etc., and to a method for controlling the same.

Description of the Related Art

Some image forming apparatuses can operate an application program on its firmware. Such image forming apparatuses have an execution environment to execute an application program. The image forming apparatuses thus can execute an application program under the environment.

In addition, a system configuration in which two or more application programs cooperate with each other to provide service has been suggested. Japanese Patent Application Laid-Open No. 2014-235576 discusses a method in which termination notification of program is performed between a plurality of application programs for cooperation with one another, and information relating to termination of a program is displayed.

SUMMARY OF THE INVENTION

According to embodiments of the present invention, an image forming apparatus that is controlled by a job processing program serving as a portion of a firmware and into which an application program is installable is provided. The image forming apparatus comprises a determination unit configured to determine whether a print job has been successfully input to the job processing program, in response to activation of the application program, a control unit configured to terminate the application program in accordance with a result of the determination that the print job has been successfully input, an acquiring unit configured to acquire a status of the print job under control of the job processing program after termination of the application program, and a notifying unit configured to notify status information based on the status acquired by the acquiring.

Further features of the present invention will become apparent from the following description of exemplary embodiments with reference to the attached drawings.

BRIEF DESCRIPTION OF THE DRAWINGS

FIG. 11 is a diagram illustrating a flowchart of processing procedure of when the setting item added in FIG. 10 is set according to the present exemplary embodiment.

DESCRIPTION OF THE EMBODIMENTS

Exemplary embodiments of the present invention are described below with reference to drawings.

Figure 1:
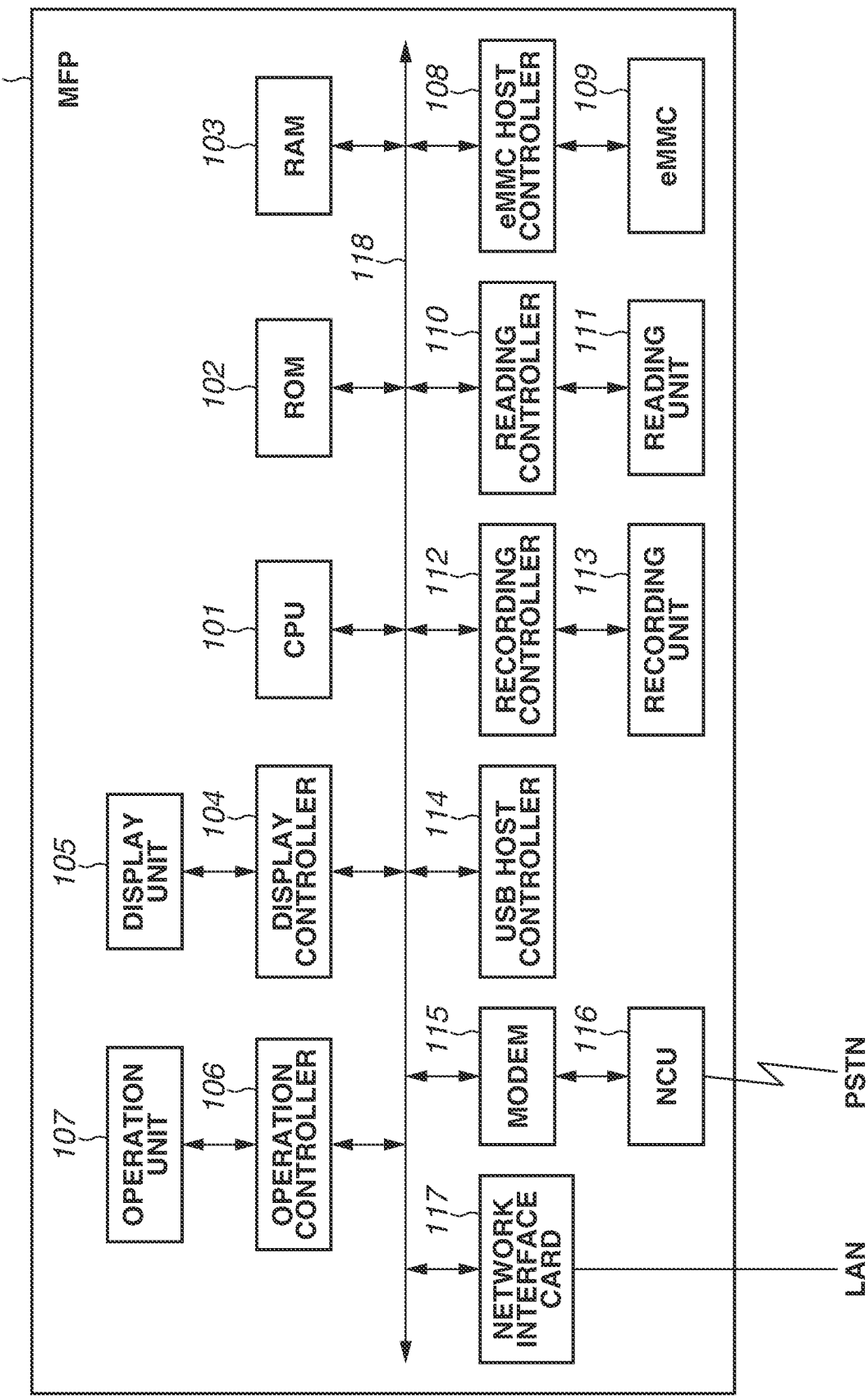
FIG. 1 is a block diagram illustrating an example of a hardware configuration of a multifunction peripheral (MFP) according to an exemplary embodiment.

FIG. 1 is a block diagram illustrating a hardware configuration of an MFP according to the present exemplary embodiment. An MFP 10 is an example of an image forming apparatus. The image forming apparatus is an example of built-in equipment. The built-in equipment includes equipment constrained in resources, such as a mobile device and a smartphone.

As illustrated in FIG. 1, the MFP 10 includes a central processing unit (CPU) 101, a read only memory (ROM) 102, a random access memory (RAM) 103, a display controller 104, a display unit 105, an operation controller 106, and an operation unit 107. The MFP 10 further includes an embedded multimedia card (eMMC) host controller 108, an eMMC 109, a reading controller 110, a reading unit 111, a recording controller 112, and a recording unit 113. Furthermore, the MFP 10 includes a universal serial bus (USB) host controller 114, a modem 115, a network control unit (NCU) 116, and a network interface card 117. The eMMC 109 is an example of a nonvolatile readable/writable storage device.

The CPU 101 generally controls devices connected to a system bus 118. When the CPU 101 is supplied with power, the CPU 101 executes a boot program held by the ROM 102. Typically, the boot program loads a main program saved in a storage to the RAM 103, and jumps to an initial position of the loaded main program. The RAM 103 functions as not only as a load space of the main program but also as a work area of the main program.

The display controller 104 controls drawing on the display unit 105. The display unit 105 is a full bitmap liquid crystal display (LCD) having a wide video graphics array (WVGA) size. In contrast, the operation controller 106 controls input from the operation unit 107 that is provided in the MFP 10. The operation unit 107 includes a tach panel superimposed on the display unit 105.

The reading unit 111 reads a document. An auto document feeder (not illustrated) is mounted as an option on the reading unit 111, and allows for automatic reading of a plurality of documents. The reading unit 111 is connected to the reading controller 110, and the CPU 101 communicates with the reading unit 111 through the reading controller 110.

The recording unit 113 performs image formation on a recording paper by an electrophotographic method. The recording unit 113 is connected to the recording controller 112, and the CPU 101 communicates with the recording unit 113 through the recording controller 112.

The USB host controller 114 performs protocol control of the USB and mediates access to an USB device such as an USB memory (not illustrated).

The modem 115 performs modulation and demodulation of a signal necessary for facsimile communication. In addition, the modem 115 is connected to the NCU 116. The signal modulated by the modem 115 is transmitted to a public telephone network (PSTN) through the NCU 116.

The network interface card 117 bidirectionally exchanges data with, for example, a mail server and a file server through local area network (LAN).

The MFP 10 according to the present exemplary embodiment includes the eMMC 109 as the storage. The CPU 101 accesses the eMMC 109 through the eMMC host controller 108.

Figure 2:
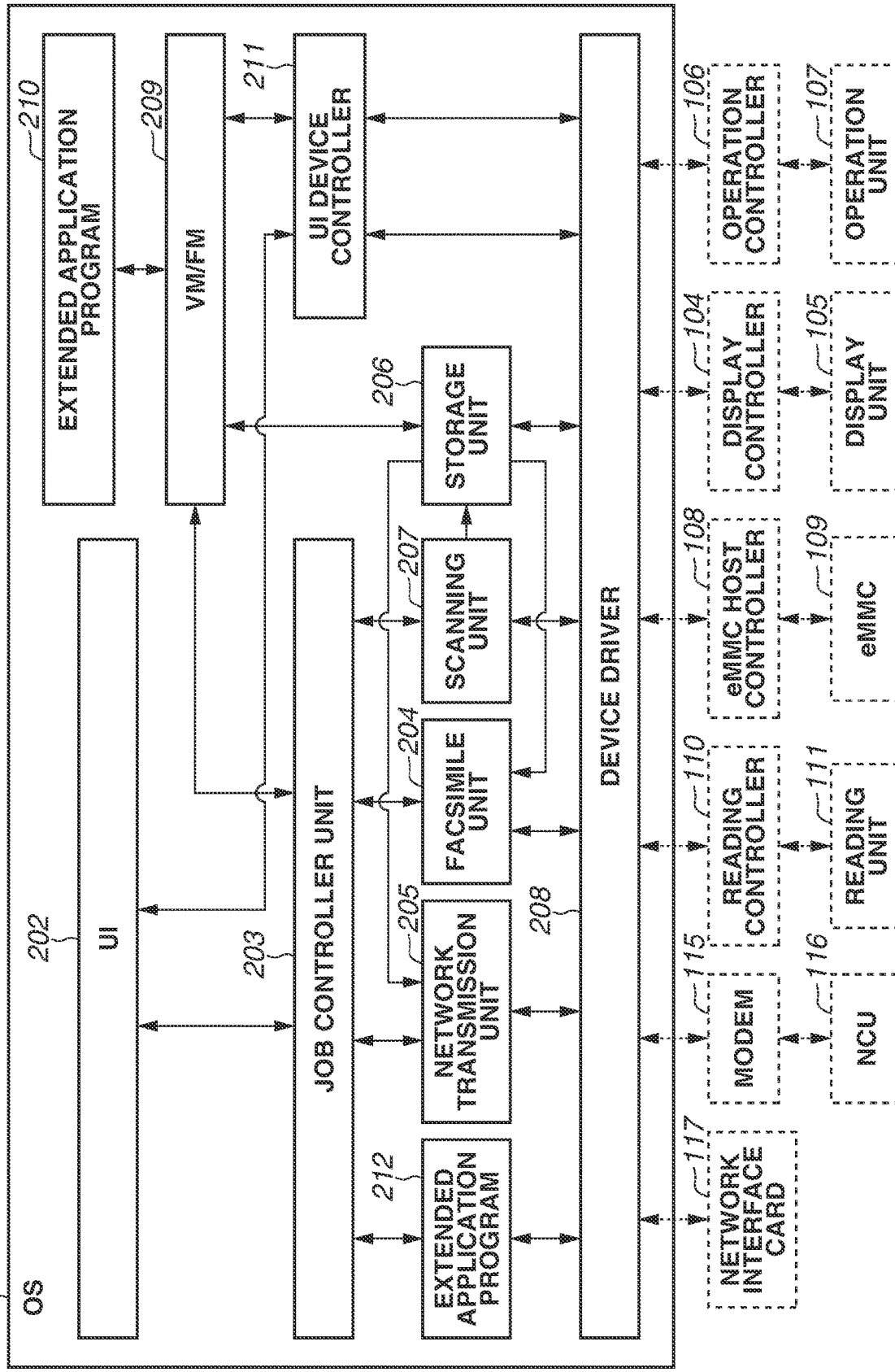
FIG. 2 is a diagram illustrating an example of a software configuration of the MFP according to the present exemplary embodiment.

FIG. 2 is a software configuration diagram of the MFP 10 according to the present exemplary embodiment. Each unit illustrated by a solid line in FIG. 2 is a software module corresponding to the main program loaded to the RAM 103 by the boot program that is executed by the CPU 101. A group of the software modules illustrated in FIG. 2 are read out to the RAM 103 and executed by the CPU 101.

Execution of each module described later corresponding to the main program is managed and controlled by an operating system (OS). An OS 201 is combined with a device driver unit 208. The device driver unit 208 mediates communication with hardware devices, such as the display controller 104, the operation controller 106, and the reading controller 110.

A user interface (UI) unit 202 provides various kinds of information to a user through the display unit 105 and the operation unit 107, and receives various kinds of instructions from the user.

A job controller unit 203 receives a job, such as copy, print, and facsimile, and controls execution of the received job.

A network transmission unit 205 is implemented by an application or a firmware. The network transmission unit 205 has a function of transmitting, to an external apparatus through the network, various kinds of documents provided from an extended application in an electronic mail format or a server message block (SMB) format.

A storage unit 206 is a software module that physically stores data such as an image transmitted/received by the facsimile and user setting, in the eMMC 109 and manages the data.

For example, in the MFP 10 according to the present exemplary embodiment, when the job controller unit 203 receives a facsimile job, a scanning unit 207 receives a request of the job to control the reading unit 111, thereby scanning a document. The scanning unit 207 then stores facsimile image data of the scanned document in the storage unit 206. The facsimile image data stored in the storage unit 206 is read out by a facsimile unit 204, and is transmitted to a destination by the facsimile through the modem 115 and the NCU 116. Alternatively, the image data received by the facsimile from the destination through the modem 115 and the NCU 116 is taken by the facsimile unit 204 and is stored in the storage unit 206.

The MFP 10 according to the present exemplary embodiment includes a virtual machine (VM)/framework (FW) unit 209. An extended application program 210 includes an optional program described in a script language, and the like. For example, language systems such as Java (registered trademark) and Lua as an interpreter that interprets and executes a bite code. The VM/FW unit 209 installs an optional program described in a script language or a predetermined high-level language in the extended application program 210. Alternatively, the VM/FW unit 209 plays a role of uninstalling an optional program from the extended application program 210. Further, the VM/FW unit 209 arbitrates an existing function and a function realized by the optional program that is installed in the extended application program 210, and the like. Further, the VM/FW unit 209 interprets and executes the described script language. Moreover, the VM/FW unit 209 transmits a message to the extended application program 210 when an event relating to the optional program installed in the extended application program 210 occurs. Examples of the event include key input detected by the UI unit 202 and expiration of a timer managed by the VM/FW unit 209. The VM/FW unit 209 forcibly terminates the program when the VM/FW unit 209 detects abnormality of the optional program installed in the extended application program 210, for example, when the extended application program 210 does not respond to the message transmitted to the extended application program 210.

For example, when a copy function that is a native application program is executed in response to pressing of a start key of the operation unit 107, operation information that indicates pressing of the start key input through the operation unit 107 is notified to the device driver unit 208 through the operation controller 106. When the device driver unit 208 notifies a UI device controller 211 of the operation information, the UI device controller 211 notifies the UI unit 202 of the operation information because the native application program is under execution. When the UI unit 202 recognizes pressing of the start key, the UI unit 202 determines that the start key of the copy function has been pressed, and notifies the job controller unit 203 of copy start, thereby executing copy. In addition, when the extended application program is activated, the UI 202 notifies the VM/FW unit 209 of the operation information. For example, when ID card scanning that is an extended application program is executed in response to pressing of the start key of the operation unit, the operation information of pressing of the start key input through the operation unit 107 is notified to the device driver unit 208 through the operation controller 106. When the device driver unit 208 notifies the UI device controller 211 of the operation information, the UI device controller 211 notifies the VM/FW unit 209 of the operation information because the extended application program is under execution. When the VM/FW unit 209 recognizes pressing of the start key, the VM/FW unit 209 notifies the ID card copy that is the extended application program 210 of pressing of the start key. The ID card copy that is the extended application program 210 determines that the start key has been pressed, and notifies the job controller unit 203 of the start of the card copy through the VM/FW unit 209, thereby executing the ID card copy.

This allows the MFP 10 according to the present exemplary embodiment to implement optional functions, such as a login application program and extended application programs 210 and 212, while maintaining detachability of the function.

The UI device controller 211 mediates output of various kinds of information to the display unit 105 by the UI unit 202 and the extended application program 210 and transmission of user operation to the UI unit 202 and the extended application program 210 by the operation unit 107. The extended application program is not limited to the extended application program 210, and a plurality of extended application programs may be additionally registered.

Figure 13:
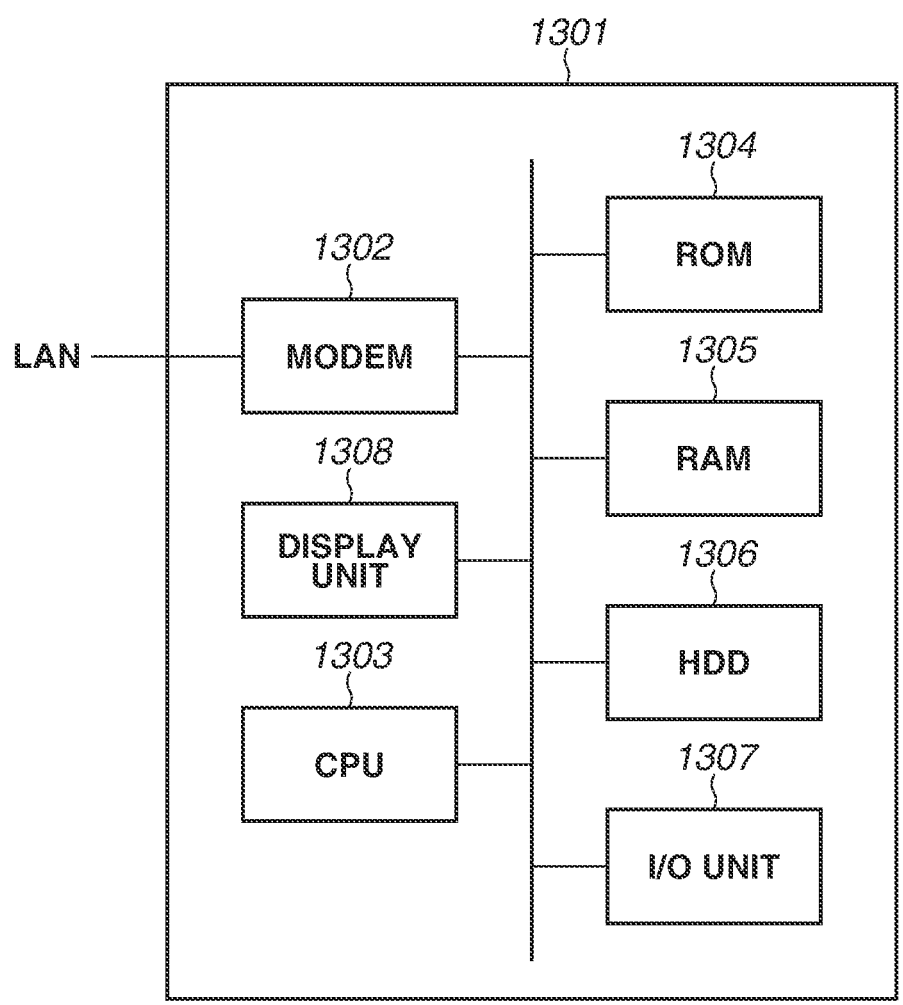
FIG. 13 is a block diagram illustrating an example of a hardware configuration of an information apparatus according to the present exemplary embodiment.

FIG. 13 is a block diagram illustrating a hardware configuration of an information apparatus 1301 according to the present exemplary embodiment. The information apparatus 1301 includes a modem 1302, a CPU 1303, a ROM 1304, a RAM 1305, a hard disk drive (HDD) 1306, and an input/output (I/O) unit 1307. The modem 1302 is a device that communicates with the MFP 10, but a network interface may be alternatively used. The ROM 1304 holds a control program and the RAM 1305 is used as a work memory. The HDD 1306 holds various data, and the I/O unit 1307 performs data exchange with the outside. The CPU 1303 performs control of the modem 1302, the CPU 1303, the ROM 1304, the RAM 1305, the HDD 1306, and the I/O unit 1307.

Figure 14:
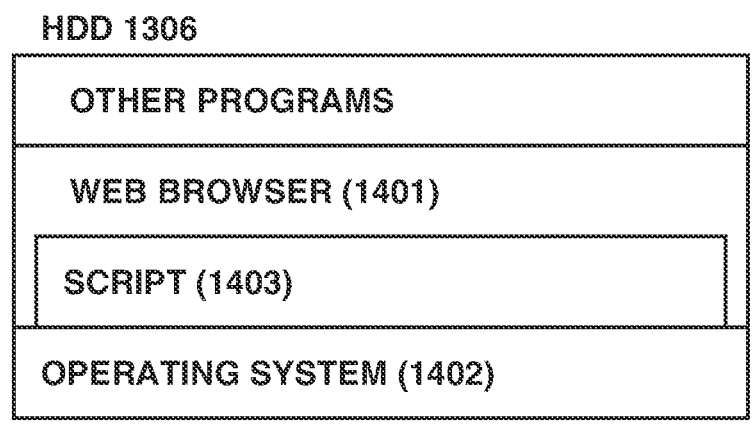
FIG. 14 is a block diagram illustrating software of the information apparatus according to the present exemplary embodiment.

FIG. 14 is a diagram illustrating a software module that is held by the HDD 1306 according to the present exemplary embodiment. A program illustrated in FIG. 14 held by the HDD 1306 is read out to the RAM 1305 and executed by the CPU 1303. Examples of the information apparatus 1301 include a personal computer, a workstation, and a smartphone. For example, a script 1403 in FIG. 14 realizes processing on button setting screen side 300-1 in FIG. 3, and the like when being executed by the CPU 1303. The HDD 1306 further holds a web browser 1401, the script 1403, and an operation system 1402.

Exemplary embodiments of the present invention are described with reference to drawings.

An extended application program according to the present exemplary embodiment performs the following operation when an extended application program start button displayed on the display unit 105 is pressed. The extended application program prints a preset file based on preset print setting to complete the processing.

Figure 3:
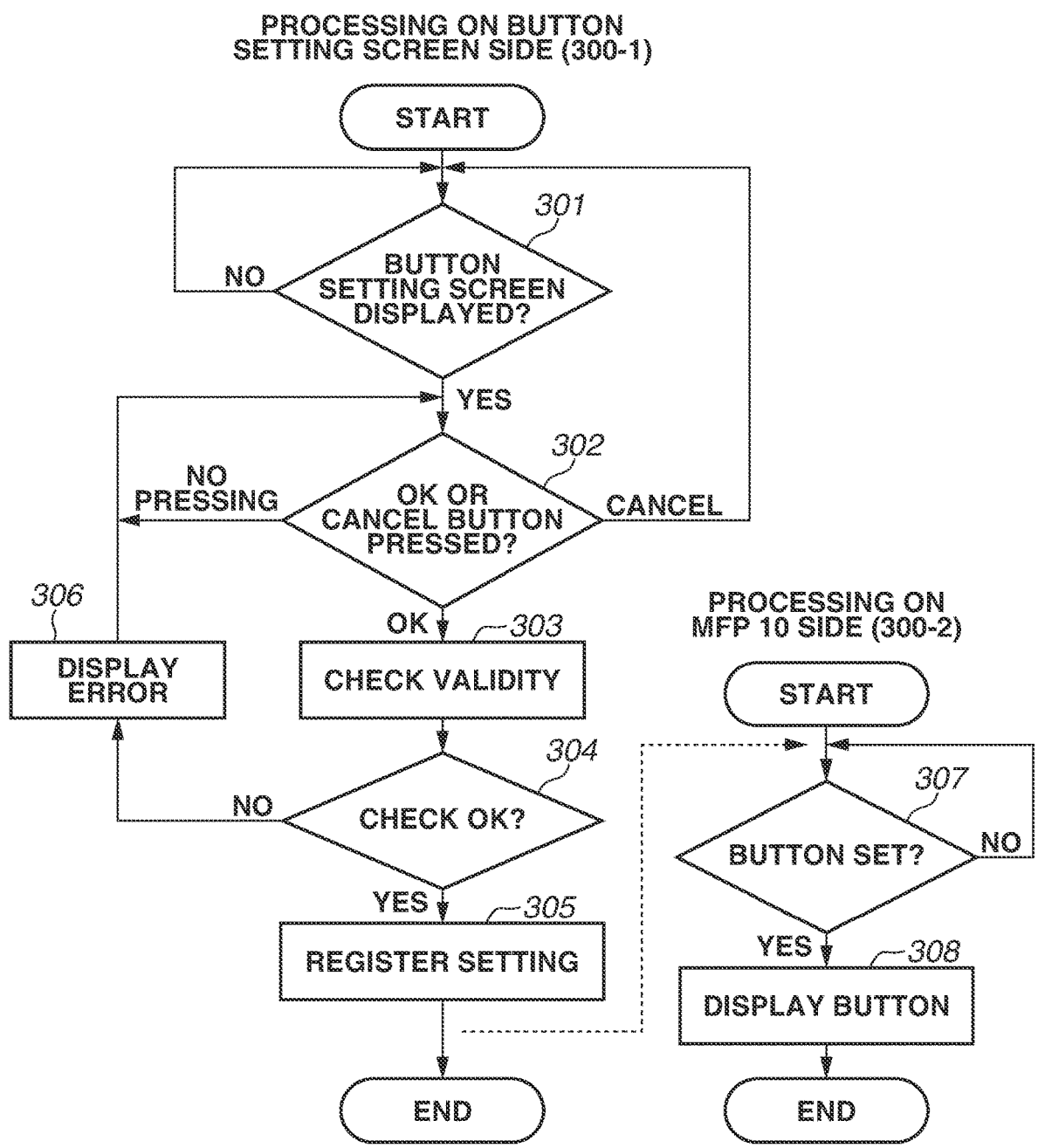
FIG. 3 is a flowchart illustrating an example of processing procedure for setting an extended application program start button according to the present exemplary embodiment.

FIG. 3 is a diagram illustrating processing procedure of when the extended application program start button is set on the display unit 105, according to the present exemplary embodiment. A reference numeral 300-1 in FIG. 3 indicates processing, on the information apparatus 1301 side, for setting the extended application program start button. The information apparatus 1301 is connected to the MFP 10 through the LAN.

The processing is executed when the CPU 1303 executes the script 1403 downloaded from the MFP 10 with use of the web browser 1401. Processing 300-2 on the MFP 10 side is executed when the CPU 101 executes the extended application program in FIG. 2.

Figure 4:
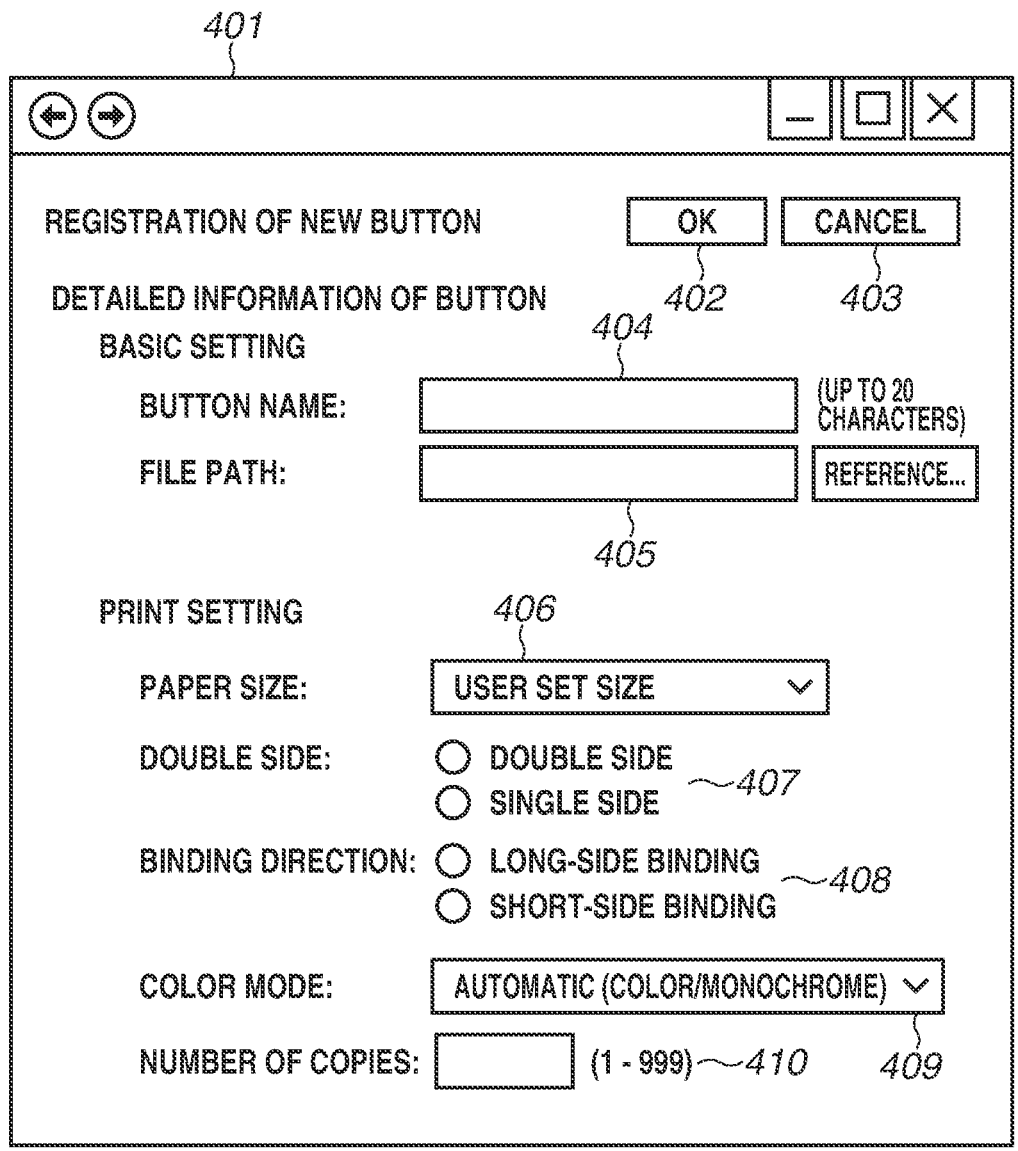
FIG. 4 is a diagram illustrating an example of a registration screen of the extended application program start button according to the present exemplary embodiment.
Figure 5:
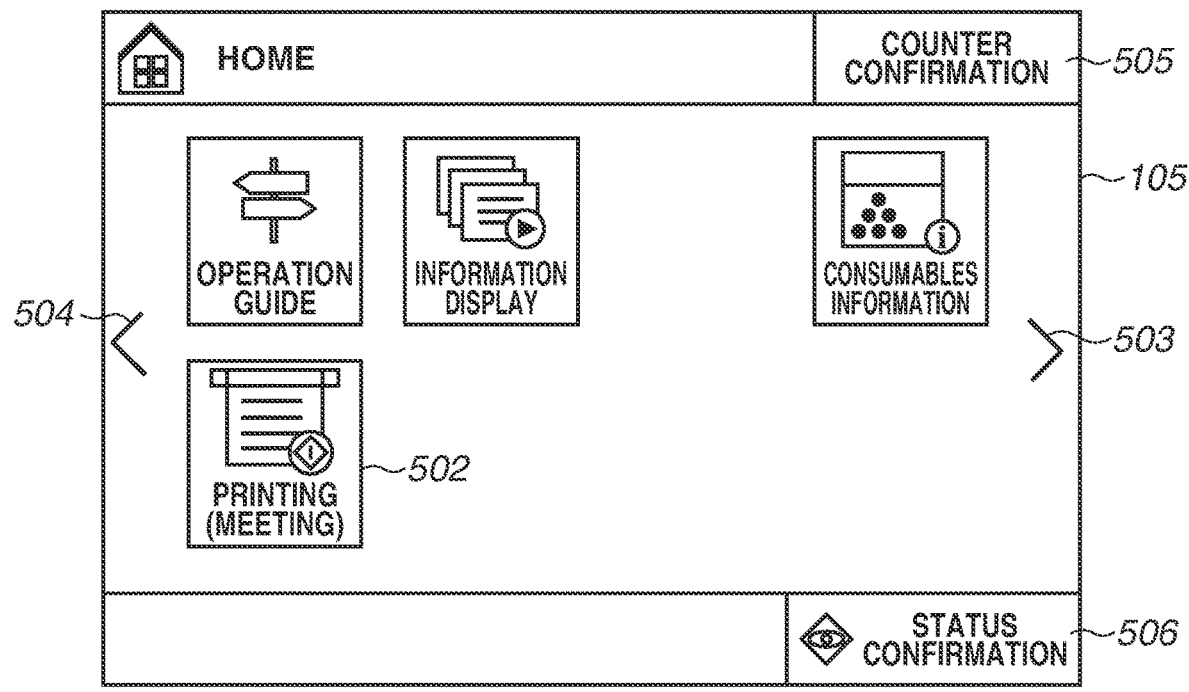
FIG. 5 is a diagram illustrating an example of a screen displayed on a display unit according to the present exemplary embodiment.

FIG. 4 is a diagram illustrating an example of a setting screen 401 of the extended application program start button. In this case, an example of a screen displayed on the web browser screen of the information apparatus 1301 that is connected to the MFP 10 through the LAN is illustrated as the setting screen. The screen is displayed on the display unit 1308 illustrated in FIG. 13. FIG. 5 is a diagram illustrating an example of a screen displayed on the display unit 105 of the MFP 10 according to the present exemplary embodiment. For example, a button of printing (meeting) 502 corresponds to one extended application. The button is registered through operation on the screen illustrated in FIG. 4. To register a new button, "printing (meeting)" is input in a button name 404 and other necessary settings are input. Thereafter, when an OK button 402 is pressed, the extended application to input a print job is transmitted together with setting values from the information apparatus 1301 to the MFP10, which may result in registration in the MFP 10. As a result, the button of the printing (meeting) 502 may be appeared on the MFP 10.

The processing 300-1 in FIG. 3 is started when the information apparatus 1301 is turned on. First, in step 301, it is determined whether access request to the setting screen 401 of the extended application program start button has been performed from the web browser 1401 of the information apparatus 1301 to the MFP 10. In a case where it is determined that the access request has not been performed (NO in step 301), the processing returns to step 301 and repeats the process. In a case where it is determined that the access request has been performed (YES in step 301), the setting screen 401 of the extended application program start button is received from the MFP 10, and the setting screen is displayed on the web browser 1401 of the information apparatus 1301. Subsequently, the processing proceeds to step 302. In this example, the setting screen 401 of the extended application program start button includes setting items such as the button name 404, a file path 405, and print settings 406 to 410, as illustrated in FIG. 4. The setting items and data specified by the file path are used to generate a print job to be issued.

Next, in step 302, it is determined whether the OK button or a cancel button has been pressed in the setting screen 401 of the extended application program start button. In other words, when the setting is input through the screen illustrated in FIG. 4, the set values and the control information are retained during the procedure in step 302 in which the input is waited. In a case where it is determined that both of the OK button and the cancel button have not been pressed (NO PRESSING in step 302), the processing returns to step S302. In a case where it is determined that the cancel button has been pressed (CANCEL in step 302), the processing returns to step 301 and repeats the process. In a case where it is determined in step 302 that the OK button has been pressed (OK in step 302), checking of whether contents set in the setting screen 401 of the extended application program start button have no defect is performed in step 303. In other words, the retained setting values are checked. The defect of the set contents indicates, for example, a case where the OK button is pressed while the button name 404 and the file path 405 in FIG. 4 are not set, and a case where the OK button is pressed while unacceptable characters are input.

In step 304, it is determined whether the setting has a defect as a result of the checking in step 303. In a case where it is determined that the setting has a defect (NO in step 304), an error screen indicating the defect of the setting is displayed in step 306, and the processing returns to step 302.

In a case where it is determined that the setting has no defect as a result of the determination in step 304 (YES in step 304), setting information is transmitted from the information apparatus 1301 to the MFP 10 in step 305. As a result, processing of registering the setting is performed, and the processing on the extended application program start button setting screen ends. The setting information is an example of the control information. The processing of registering the setting includes addition of button information to a list of buttons to be displayed on the display unit 105. In this process, the checking of the setting in step 303 is assumed to be performed in a script language such as JavaScript (registered trademark) contained in the contents displayed on the web browser 1401. In addition, the setting contents may be transmitted from the web browser 1401 to the MFP 10 and confirmed by the MFP 10, and a confirmation result may be returned to the web browser 1401.

The processing on the MFP 10 side in FIG. 3 is started in response to power-on. On the MFP 10, in step 307, it is determined whether list information of the buttons to be displayed on the display unit 105 has been updated. In other words, the list information of the buttons transmitted from the information apparatus 1301 to the MFP 10 according to the setting registration in step 305 is confirmed. In a case where the list information of the buttons has not been updated (NO in step 307), the processing returns to step 307 and repeats the process. In a case where it is determined that the list information has been updated (YES in step 307), the extended application program start button is displayed on the display unit 105 in step 308, and the processing on the MFP 10 side ends. A button 502 is an example of the extended application program start button displayed on the display unit 105 illustrated in FIG. 5. As the button name of the extended application program start button, the name set in the button name of the setting screen 401 of the extended application program start button is displayed. Further, a button 505 to make a transition to a counter checking screen for checking a value of a counter and a button 506 to make a transition to a status checking screen for checking a status of the job and the devices may be also displayed on the display unit 105. The button displayed in FIG. 5 is added, based on the information input in FIG. 4. The information apparatus 1301 may acquire the setting information of existing application buttons from the MFP 10, update and verify the setting information in a similar manner, and write back the setting information to the MFP 10.

Figure 6:
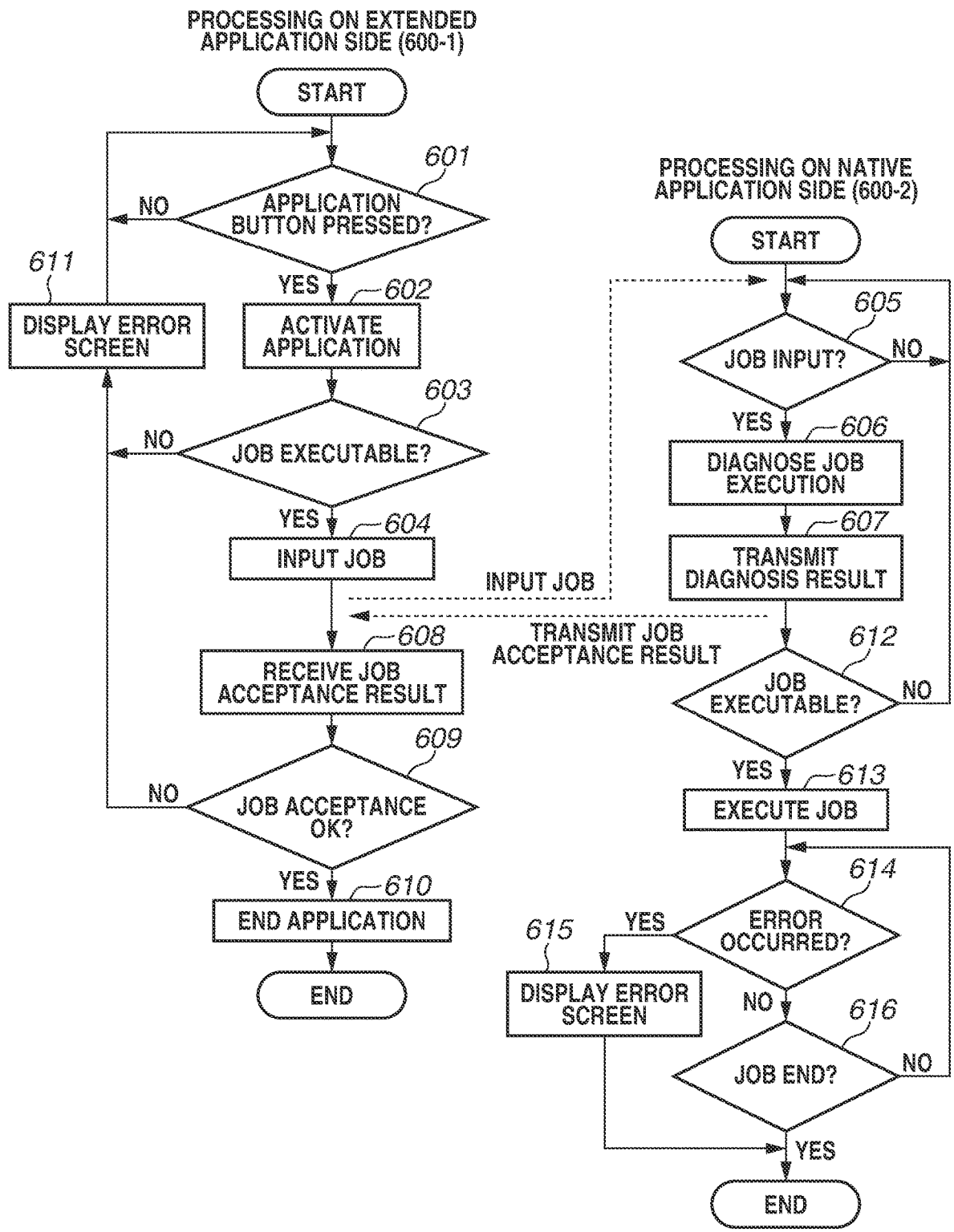
FIG. 6 is a flowchart illustrating an example of processing procedure of when the extended application program start button is pressed according to the present exemplary embodiment.

FIG. 6 is a flowchart illustrating processing procedure of when the extended application program start button is pressed, according to the present exemplary embodiment. In FIG. 6, processing 600-1 is processing on the extended application program side, and processing 600-2 is processing on the native application side. The processing 600-2 is performed mainly by the VM/FW unit 209 and the job controller unit 203. The processing on the native application side 600-2 in FIG. 6 may be all executed by the job controller unit 203. The processing 600-1 is executed by the extended application unless otherwise noted.

The processing 600-1 and 600-2 in FIG. 6 are started in response to power-on of the MFP 10. At the beginning, the extended application is in a stopped state, an interrupted state, or an end state. First, in step 601, it is determined whether the extended application program start button displayed on the display unit 105 has been pressed. The determination is performed by the CPU 101. Alternatively, the determination may be performed by the currently-suspended extended application. In addition, the determination may be performed by the VM/FW unit 209. In a case where it is determined that the extended application program start button has not been pressed (NO in step 601), the processing returns to step 601 and repeats the process. In a case where it is determined that the extended application program start button has been pressed (YES in step 601), the extended application program corresponding to the extended application program start button is activated in step 602. Next, in step 603, acquisition of a file to be printed and checking of print execution authority are performed on the basis of the contents set in the setting screen 401 of the extended application program start button in FIG. 4, and determination whether printing is executable is performed.

The extended application program is executed and the execution start instruction of the print job is input to the job processing program. As a result, in a case where a return value of the start instruction is an affirmative value, the CPU 101 may determine that the job processing program has been successfully input. In a case where it is determined that the printing is not executable in step 603 (NO in step 603), an error screen is displayed in step 611 and the processing returns to step 601. The process may be performed by the extended application program, on the basis of various kinds of authentication and a collation result with authority database.

Figure 8:
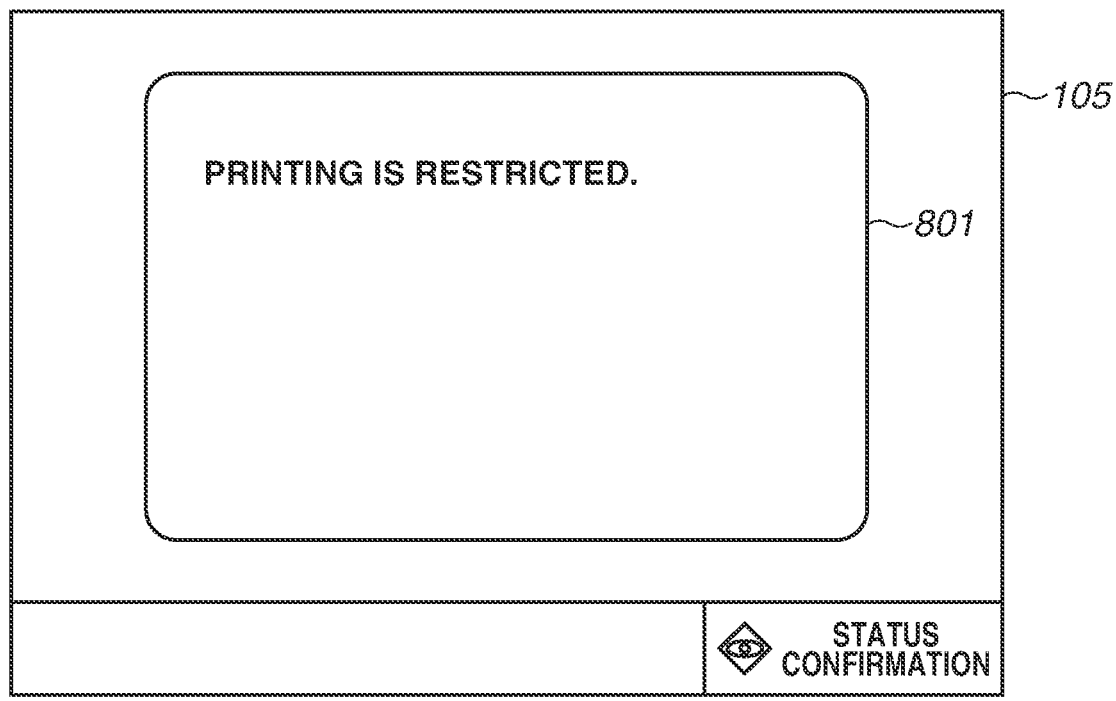
FIG. 8 is a diagram illustrating an example in a case where printing restriction is applied to a user according to the present exemplary embodiment.

FIG. 8 illustrates an example of the error screen. FIG. 8 illustrates an example case where printing restriction is applied to the user. A message corresponding to each error is displayed on a region 801 of the display unit 105. The display may be performed by the extended application program or may be performed by the job controller unit 203.

In a case where it is determined in step 603 that the printing is executable (YES in step 603), the job is input in step 604. The job is input when the extended application program 210 instructs execution of the job to the job controller unit 203 through the VM/FW unit 209.

Figure 7:
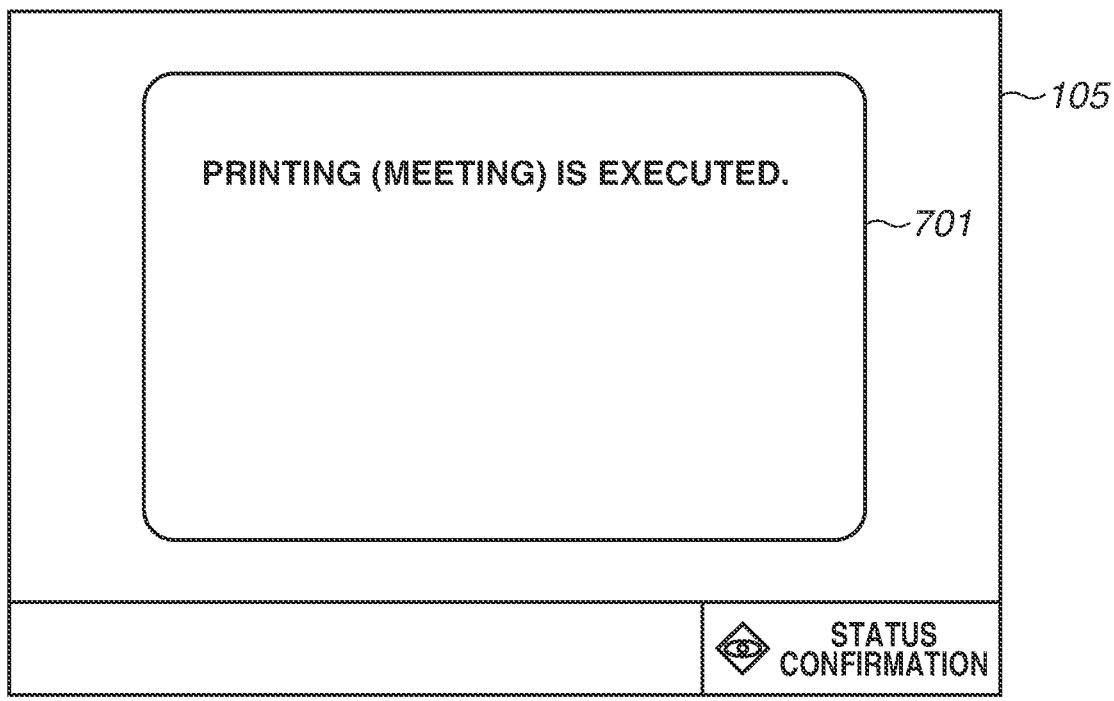
FIG. 7 is a diagram illustrating an example of a screen displayed on the display unit when a job is input according to the present exemplary embodiment.

FIG. 7 illustrates a screen example of the display unit 105 when the job is input. For example, as illustrated in FIG. 7, the button name of the extended application program start button and the message of processing execution are displayed. It is desirable that the extended application program ends immediately after or after a predetermined time is elapsed after the screen of FIG. 7 is displayed. Thereafter, the screen of FIG. 7 is preferably returned to the screen before the execution of the extended application (under control of the firmware).

On the native application side, in step 605, it is determined whether the extended application program 210 has instructed the job execution to the job controller unit 203 through the VM/FW unit 209. In a case where it is determined that the job has not been input (NO in step 605), the processing returns to step 605 and repeats the process. In a case where it is determined that the job has been input (YES in step 605), acceptance determination of whether the job is executable is performed in step 606. In step 607, a result of the acceptance determination is transmitted to the extended application program 210. In this process, the job controller unit 203 performs checking of the setting values of the input job, and the like. For example, when a value out of the system definition is set to the job, the job input is not accepted. For example, when use of a user defined sheet is specified for the job but the user defined sheet is not set in the MFP 10, the job controller unit 203 determines not to accept the job input. Likewise, the job controller unit 203 determines not to accept the job input when a value out of the system definition is set due to a bug of the extended application program or the like.

In step 608, the extended application program receives an acceptance result that has been transmitted in step 607. In step 609, it is determined whether the acceptance result received in step 608 indicates that the job is executable. The determination whether the job is executable is performed by the native application side in step 612.

In a case where the extended application program determines that the received acceptance result indicates that the job is not executable (NO in step 609), a corresponding error screen is displayed in step 611, and the processing returns to step 601 and repeats the process. In a case where the extended application program determines that the received acceptance result indicates that the job is executable (YES in step 609), the extended application program terminates the processing of the script language in step 610, and the application program ends.

Figure 9:
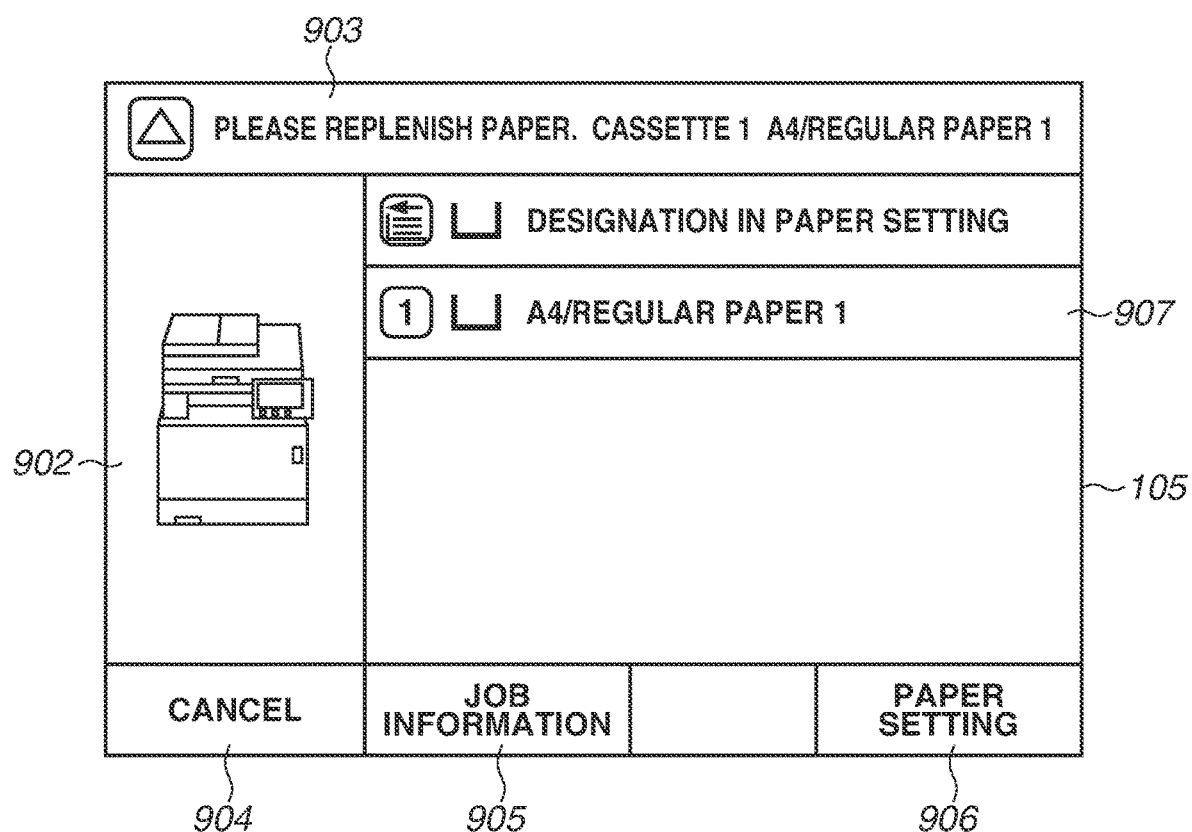
FIG. 9 is a diagram illustrating a screen example of an error that occurs during job execution according to the present exemplary embodiment.

On the native application side, after the job acceptance result is transmitted in step 607, it is determined in step 612 whether the job is executable based on the determination result in step 606. In a case where it is determined that the job is not executable (NO in step 612), the processing returns to step 605 and repeats the process. In a case where it is determined that the job is executable (YES in step 612), the job is executed in step 613. Next, in step 614, it is determined whether an error during the job execution has occurred. In a case where it is determined that the error during the job execution has occurred (YES in step 614), an error screen is displayed in step 615 and the processing then ends. The error during the job execution is an error occurred during the job execution, such as no sheet error and paper jam error as illustrated in FIG. 9. In a case where it is determined in step 614 that the error during the job execution has not occurred (NO in step 614), it is determined in step 616 whether the job has ended. In a case where it is determined that the job has not ended (NO in step 616), the processing returns to step 614 and repeats the process. In a case where it is determined that the job has ended (YES in step 616), the processing ends as is.

In the present exemplary embodiment, an error may occur (step 614) during the processing after it is determined in step 612 that the job is executable. In a case where it is determined in step 612 that the job is executable, however, the determination is instantaneously notified to the extended application, and the extended application ends (step 610) in response to reception of the job acceptance result (step 608). Therefore, the timing of step 610 is assumed to be earlier than the timing of step 614. In other words, the error screen in step 615 can be displayed by the job controller unit 203 through the UI unit 202 even if the extended application has ended. More specifically, after the extended application ends, the job controller unit 203 and the UI unit 202 that are a portion of the native firmware perform error determination and error display. In addition, after the extended application program ends (step 608), it may be possible to instruct operation of other extended application program 212 through the VM/FW unit 209. If an error occurs on the job that has been input by the extended application program 210 while the other extended application program 212 operates, the job controller unit 203 determines that an error has occurred. Further, the job controller unit 203 notifies the UI unit 202 of detail of the occurred error. The UI unit 202 that has received the notification of the error may display, on the display unit 105, an error screen illustrated in FIG. 9 through overriding or changeover with the screen on the operating extended application program 212. In addition, the UI unit 202 notifies the error including semantic contents similar to those in FIG. 9 in a predetermined format through the network interface card 117 and the network. In this process, for example, the UI unit 202 may display recovery processing of the job (a procedure of a method of removing the paper jam, etc.) on the display unit 105 depending on the detail of the occurred error in addition to the screen of FIG. 9. If the user replenishes paper to remove the factor of the error after the screen of FIG. 9 is displayed, the screen returns to an original screen. The original screen is a screen immediately before the error has occurred. The screen may return to a home screen or may return to the processing screen of the extended application program 212.

Figure 10:
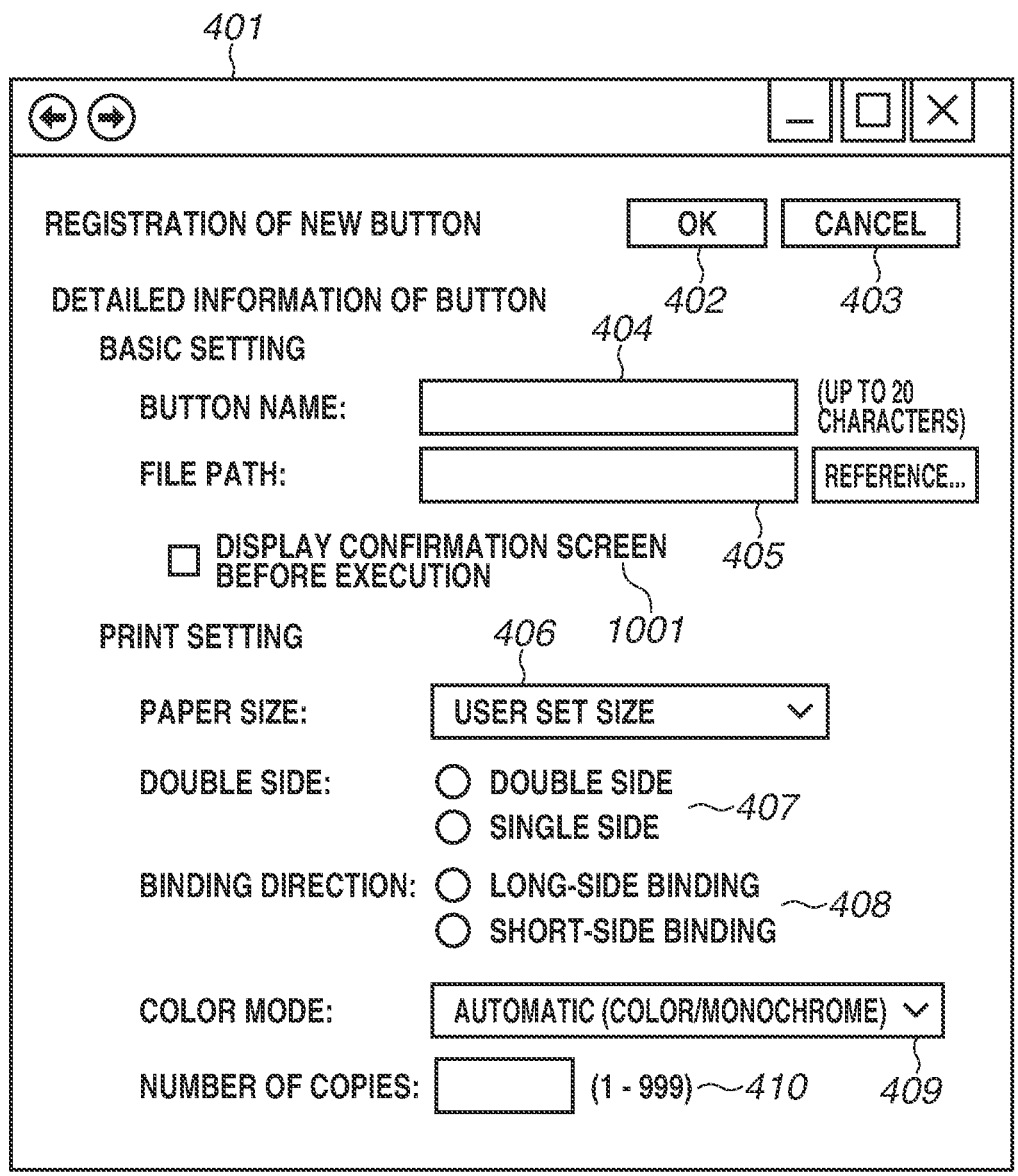
FIG. 10 is a diagram illustrating an example in which a setting item is added to the registration screen in FIG. 4 according to the present exemplary embodiment.

FIG. 10 is a diagram illustrating an example of the setting screen in a case where an item of setting "display confirmation screen before execution" (1001) is added to the setting items of the setting screen 401 of the extended application program start button.

FIG. 11 is a flowchart illustrating the processing procedure of when the item "display confirmation screen before execution" is set in the setting screen 401 of the extended application program start button. The processes other than processes between step 603 and step 604 are similar to the processes in FIG. 6, and description of such processes is omitted.

Figure 12:
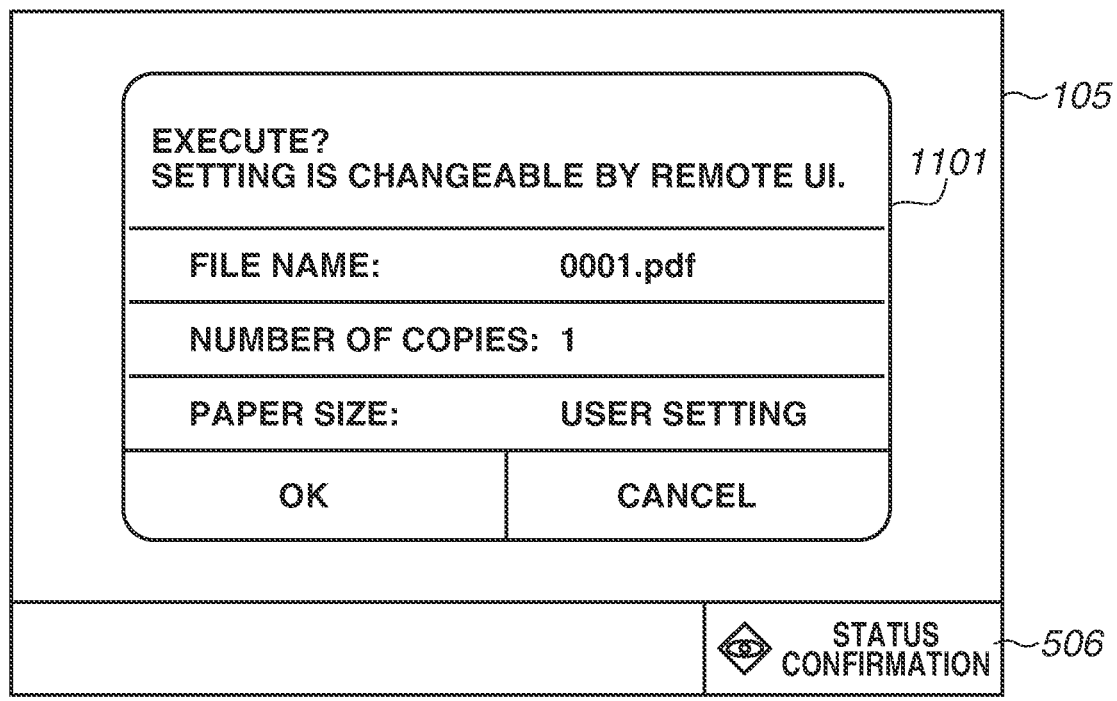
FIG. 12 is a diagram illustrating an example of a confirmation screen before execution according to the present exemplary embodiment.

In a case where it is determined in step 603 that printing is executable (YES in step 603), it is determined in step 1101 whether the display of the confirmation screen before execution has been set. In a case where it is determined that the display of the confirmation screen before execution has not been set (NO in step 1101), the processing proceeds to step 604 and the job is input. In a case where it is determined that the display of the confirmation screen before execution has been set (YES in step 1101), the confirmation screen before execution is displayed in step 1102. The display of the confirmation screen before execution is set in the web browser 1401 of the information apparatus 1301 as with the screen in FIG. 4, and the setting information is transmitted to the MFP 10 through the LAN. The setting information is stored in the eMMC 109 and is loaded to the RAM 103 when the application program is activated. When the application program switches operation whether to display the confirmation screen before execution, by checking the information in the PAM 103. FIG. 12 illustrates an example of the confirmation screen before execution. For example, the confirmation screen before execution includes display of a name of a file to be executed, the number of copies, setting values of paper size, and a button to instruct whether to execute the job.

Next, in step 1103, it is determined whether any button has been pressed on the confirmation screen before execution. In a case where it is determined that any button has not been pressed (NO PRESSING in step 1103), the processing returns to step 1102 and repeats the process. In a case where it is determined that a "cancel" button has been pressed (CANCEL BUTTON in step 1103), the processing returns to step 601 and repeats the process. In a case where it is determined that an "OK" button has been pressed (OK BUTTON in step 1103), the processing proceeds to step 604 and the job is input.

The above description is summarized as follows. The MFP 10 that is an example of the image forming apparatus is controlled with use of the job controller unit 203 that is an example of the job processing program. The job processing program is a portion of the firmware. Further, the extended application program that is an example of the application program is installable in the MFP 10. The MFP 10 includes the CPU 101 that determines whether the print job has been successfully input to the job processing program, in accordance with activation of the extended application program. The CPU 101 terminates the extended application program, on the basis of the determination by the CPU 101 that the print job has been successfully input. After the extended application program ends, the CPU 101 acquires the status of the print job under control of the job controller unit 203. Further, the CPU 101 controls the processing of notifying the status information, on the basis of the status acquired by the CPU 101. More specifically, the status acquired by the CPU 101 is displayed on the display unit 105, for example, as illustrated in FIG. 9.

Furthermore, the CPU 101 can register the control information relating to the print job that is to be input by the extended application program. Examples of the control information include information, illustrated in FIG. 10, input through an input screen that is displayed on the display unit 1308 of the information apparatus 1301. The information is transmitted from the information apparatus 1301 to the MFP 10 through the network. The CPU 101 of the MFP 10 controls the processing of recording and registering the received control information in the ROM 102, the eMMC 109, and the like. The control information includes the information to control whether to display the confirmation screen (for example, FIG. 12) on the display unit 105 of the MFP 10 before the extended application program inputs the job. The information may be input through the operation of the check box 1001 in FIG. 10. In addition, it is possible to update the display unit 105 connected to the MFP 10, on the basis of the status information.

It is assumed that the extended application program is executed and the execution start instruction of the print job is input to the job processing program. As a result, when the return value of the start instruction is an affirmative value, the CPU 101 may determine that the job processing program has been successfully input. The CPU 101 then terminates the extended application program.

Further, after the extended application program ends, an error relating the print job is recognized during the execution of the print job under control of the job controller unit 203. The CPU 101 then controls the processing of notifying the error relating to the print job, under control of the job controller unit 203.

Moreover, the CPU 101 determines that the input of the print job has been failed when a value out of the print system definition is set to the print job. In addition, the job controller unit 203 notifies the extended application program of the failure in the input of the print job.

According to the present exemplary embodiment, since the application program does not perform error handling until the execution of the job is completed, it is unnecessary for the application program to wait the execution result until the processing of the job is completed. In addition, the application program does not consume resources for the error handling. Further, the built-in equipment that exclusively operates the application program as a main application program for resource constraint has been disclosed. In such built-in equipment, the application program occupies the main processing until the job ends, and it is therefore not possible to execute activation/processing of the other application programs until the processing of the job ends.

The present exemplary embodiment makes it possible to solve one or more of the above-described issues.

The present exemplary embodiment provides a mechanism that effectively utilizes resources of the built-in equipment such as the image forming apparatus. Further, another aspect of the present exemplary embodiment provides a mechanism in which resources of the image forming apparatus is not occupied when a job is executed with use of an application program.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-230828, filed Nov. 29, 2016, which is hereby incorporated by reference herein in its entirety.

What is claimed is:

1. An image forming apparatus that is controlled by a job processing program serving as a portion of a firmware and into which an application program is installable, the image forming apparatus comprising:
   one or more hardware processors, which when executing instructions stored in a memory, performs operations including:
   inputting a print job to the job processing program by a print application program for setting a print setting to the print job;
   determining, by the job processing program, whether a print job has been successfully input in the image forming apparatus;
   receiving, by the print application program, a result of the determination from the job processing program;
   terminating the print application program in accordance withe receiving a result of the determination that the print job has been successfully input in the image forming apparatus, before the print application program recieves completion notification of the print job;
   acquiring a status of the print job under control of the job processing program after termination of the print application program; and
   notifying status information based on the status acquired by the acquiring.

2. The image forming apparatus according to claim 1, wherein the operations further include:
   registering control information relating to a print job to be input by the print application program; and
   controlling by the control information whether to display a confirmation screen before the print application program inputs a print job.

3. The image forming apparatus according to claim 1, wherein the operations further include updating, on a basis of the status information, a display unit that is connected to the image forming apparatus, to perform the notifying.

4. The image forming apparatus according to claim 1, wherein the operations further include:
   terminating the print application program in accordance with a result of determination that the job processing program has been successfully input in a case where the application is executed, a start instruction of execution of the print job is input to the job processing program, and a return value of the start instruction is an affirmative value; and
   notifying, in a case where an error relating to the print job is recognized in the processing of the print job under control of the job processing program after termination of the print application program, occurrence of the error relating to the print job under control of the job processing program.

5. The image forming apparatus according to claim 1, wherein the operations further include notifying failure of the input of the print job to the print application program in accordance with a result of determination that the input of the print job has been failed in a case where a value out of printing system definition is set to the print job.

6. The image forming apparatus according to claim 1, wherein failure of the input job is determined in a case where use of a user defined sheet is specified to a print job and the user defined sheet is not set in the image forming apparatus.

7. A method of controlling an image forming apparatus that is controlled by a job processing program serving as a portion of a firmware and into which an application program is installable, the method comprising:
   inputting a print job to the processing program by a print application program for setting a print setting to the print job;
   determining, by the job processing program, whether a print job has been successfully input in the image forming apparatus;
   receiving, by the print application program, a result of the determination from the job processing program;
   terminating the print application program in accordance with receiving a result of the determining that the print job has been successfully input in the image forming apparatus, before the print application program receives completion notification of the print job;
   acquiring a status of the print job under control of the job processing program after termination of the print application program; and
   notifying status information based on the status acquired by the acquiring.

8. The method according to claim 7, further comprising:
   registering control information relating to a print job to be input by the print application program; and
   controlling by the control information whether to display a confirmation screen before the print application program inputs a print job.

9. The method according to claim 7, further comprising updating, on a basis of the status information, a display unit that is connected to the image forming apparatus, to perform the notifying.

10. The method according to claim 7, further comprising:
    terminating the print application program in accordance with a result of the determining that the job processing program has been successfully input in a case where the application is executed, a start instruction of execution of the print job is input to the job processing program, and a return value of the start instruction is an affirmative value; and
    notifying, in a case where an error relating to the print job is recognized in the processing of the print job under control of the job processing program after the print application program, occurrence of the error relating to the print job under control of the job processing program.

11. The method according to claim 7, wherein failure of the input job is determined in a case where use of a user defined sheet is specified to a print job and the user defined sheet is not set in the image forming apparatus.

12. A non-transitory computer-readable storage medium storing executable instructions, which when executed by an image forming apparatus that is controlled by a job processing program serving as a portion of a firmware and into which an application program is installable, cause the image forming apparatus to perform operations comprising:
    inputting a print job to the job processing program by a print application program for setting a print setting to the print job;
    determining, by the job processing program, whether a print job has been successfully input in the image forming apparatus;
    receiving, by the print application program, a result of the determination from the job processing program;
    terminating the print application program in accordance with receiving a result of the determination that the print job has been successfully input in the image forming apparatus, before the print application program receives completion notification of the print job;
    acquiring a status of the print job under control of the job processing program after termination of the print application program; and
    notifying status information based on the status acquired by the acquiring.

13. An image forming apparatus that is controlled by a job processing program serving as a portion of a firmware and into which an application program is installable, the image forming apparatus comprising:
    one or more hardware processors, which when executing instructions stored in a memory, performs operations including:
    inputting a print job to the job processing program by a print application program for setting a print setting to the print job;
    determining, by the job processing program, that a print job has been successfully input in the image forming apparatus;
    receiving, by the print application program, a result of the determination from the job processing program;
    terminating the print application program in accordance with receiving a result of the determination, before the print application program receives completion notification of the print job;
    acquiring a status of the print job under control of the job processing program after termination of the print application program; and
    notifying status information based on the status acquired by the acquiring.

14. A method of controlling an image forming apparatus that is controlled by a job processing program serving as a portion of a firmware and into which an application program is installable, the method comprising:
    inputting a print job to the job processing program by a print application program for setting a print setting to the print job;

determining, by the job processing program, that a print job has been successfully input in the image forming apparatus;

receiving, by the print application program, a result of the determination from the job processing program;

terminating the print application program in accordance with receiving a result of the determining, before the print application program receives completion notification of the print job;

acquiring a status of the print job under control of the job processing program after termination of the print application program; and notifying status information based on the status acquired by the acquiring.

* * * * *